United States Patent [19]

Kim

[11] Patent Number: 5,243,563
[45] Date of Patent: Sep. 7, 1993

[54] SEISMIC DEPTH IMAGING

[75] Inventor: Young C. Kim, Houston, Tex.

[73] Assignee: Exxon Production Research Company, Houston, Tex.

[21] Appl. No.: 957,971

[22] Filed: Oct. 2, 1992

[51] Int. Cl.$^5$ ............................................. G01V 1/36
[52] U.S. Cl. ............................................. 367/50; 367/51
[58] Field of Search ................... 367/50, 51, 52, 53

[56] References Cited

U.S. PATENT DOCUMENTS

| | | | |
|---|---|---|---|
| 4,905,204 | 2/1990 | Hughes | 367/62 |
| 4,964,098 | 10/1990 | Hornbostel | 367/73 |
| 5,111,437 | 5/1992 | Rice | 367/57 |

OTHER PUBLICATIONS

Teng et al., "Finite-element Prestack Reverse-Time Migration for Elastic Waves," *Geophysics*, v. 54, #9, Sep. 1989.

Larner et al., "Depth Migration of Complex Offshore Seismic Profiles," 10th Ann. Offshore Technology Conf., Houston, TX, May 1978, OTC-3172.

*Seismic Data Processing*, Yilmaz, Ozdogan, Society of Exploration Geolophysicists.

*Steep-Dip Time Migration and Residual Depth Migration*, Black, J. L., (IBM), Brzostowski, M. A. (Halliburton Geophysical Services, Inc.).

*Primary Examiner*—Ian J. Lobo
*Attorney, Agent, or Firm*—Susan A. McLean; John R. Casperson

[57] ABSTRACT

The mispositioning of reflectors in a velocity analysis enhanced common-offset time migrated image is corrected by carrying out inverse migration on the time image, followed by zero-offset depth migration.

8 Claims, No Drawings

SEISMIC DEPTH IMAGING

BACKGROUND OF THE INVENTION

The invention generally relates to locating structures in the earth. In one aspect, the invention relates to forming images which represent geologic structures from seismic data.

BACKGROUND OF THE INVENTION

In seismic exploration, trace migration is often used to facilitate understanding the data. This is carried out by a computer program which rearranges the data so that the reflections and diffraction events are plotted at the actual locations of the reflectors and diffracting points rather than their apparent locations. The process is also called imaging and the objective is to provide an image of the subsurface which is consistent with the actual geology.

The data attributes on which migration is based are the magnitude and direction of the apparent dip (which defines the ray path) and arrival time (which defines the distance along the ray path). In order to perform the migration, certain assumptions have to be made about velocity. Common offset migration where the velocity function varies only vertically can be implemented very efficiently to reduce the computer costs. When the actual subsurface velocities vary with depth only and match with the migration velocities, the images from different offsets will be identical to each other and seismic reflectors will be placed at their correct depth locations. However, when the subsurface velocities change both vertically and laterally, the results of migration with the velocity function varying vertically will be incorrect. When the velocity derived from the velocity function is faster than the subsurface velocity, the reflector will be over-migrated and positioned below the correct location. When the velocity derived from the velocity function is slower than the subsurface velocity, the reflector will be under-migrated and positioned above the correct location. Thus the velocity error causes a positioning error. Furthermore, this error increases as a function of offset and causes misalignment of the images from different offsets. The alignment error increases with offset in a manner similar to normal moveout.

The misalignment of the reflectors in common midpoint (CMP) gathers due to velocity errors degrades the signal-to-noise ratio (S/N) enhancement when reflectors are stacked. It is known that a velocity analysis can be carried out after applying normal moveout to the migrated results to correct the misalignment. The resulting new velocities enable the misaligned reflectors to be flattened and result in an enhanced S/N when the images from different offsets are stacked. However, this way of correcting misalignment is referenced with respect to the nearest offset which is positioned incorrectly. Although the S/N can be enhanced, the positioning error in the nearest offset cannot be corrected by a post migration velocity analysis. Consequently, if the time image is vertically converted to a depth image, the seismic reflectors will be incorrectly positioned.

Thus, the difference between the migration velocity and the subsurface velocity (which is specified by a model) causes misalignments of seismic reflectors in common midpoint (CMP) gathers in addition to mispositioning the reflectors.

SUMMARY OF THE INVENTION

The invention uses common offset migration and velocity analysis as a S/N enhancement tool while acknowledging mispositioning by migration velocities. After the S/N enhancment, mispositioning is corrected by carrying out inverse migration (or demigration) on the migrated time image followed by zero-offset depth migration using a velocity model with velocity that may vary both vertically and laterally.

The benefits of the invention are significant. First, it is far more cost effective than prestack depth migration (particularly for 3-D). Computer costs for common-offset migration with a vertically varying velocity function is much less than for a prestack depth migration. Moreover, since model updating may be done by kinematic migration/ray tracing, both labor and computer costs can be considerably less than those which rely on iterating prestack depth migration for model updating. A second important advantage of the invention is that because the positioning error of the prestack time migration is completely removed by the inverse migration, the subsequent repositioning by zero-offset depth migration will be fully consistent with the subsurface velocity model used in this migration, and because it is a depth migration the velocity model is free to track any vertical or lateral velocity variations that are deemed to be geologic.

DETAILED DESCRIPTION OF THE INVENTION

The purpose of the invention is to correct the positioning error in a prestack time-migrated image due to a laterally varying velocity field. Generally speaking, the invention employs common-offset time-migration and velocity analysis as a S/N enhancement tool. After the S/N enhancement, mispositioning is corrected by carrying out inverse migration on the time image. Pseudo zero-offset data resulting from the inverse migration is then subjected to a zero-offset depth migration to produce the final depth image.

The input to the common offset migration is a seismic data set amenable to such treatment. Common offset traces constitute a suitable data set. Common offset traces are traces which have the same shot to geophone distance. The traces can be gathered into common offset gathers for summing and enhancement of the signal with suppression of the noise. To keep expenses down, the common offset migration is performed with a vertically varying, laterally constant velocity function to produce a prestack common offset time migrated data set. This type of velocity function causes two problems which must be subsequently corrected in order to produce an accurate depth image. First, the velocity error caused by the function causes misalignment of seismic reflectors in common midpoint gathers. Secondly, the velocity errors causes mispositioning of reflectors. These errors are corrected in accordance with the present invention.

The first step is to carry out a common offset migration. Although there are several ways of carrying out common offset migration, a preferable approach is to use a migration technique that can honor ray bending for vertical velocity variations. Deregowski, (Deregowski, S.M., 1990, Common Offset Migration and Velocity Analysis: First Break, 8,225-234) describes a common offset migration by a sequence of normal moveout (NMO) correction, dip moveout (DMO), and the Stolt frequency-wave number migration. Instead of the Stolt migration, which cannot honor ray bending, recursive migration, as described by Kim et al (Kim, Y. C., et al, 1989, Recursive Wave Number-Frequency Migration: Geophysics, 54,3319-3329), is preferably used. Honoring ray bending for vertical velocity changes eliminates conflicting velocities caused by incorrect migration of steeply dipping events.

The common offset migrated data resulting from the common offset time migration have normal moveout applied and are then subjected to velocity analysis. The purpose of these steps is to correct the misalignment of the reflectors on different offsets. Stacking velocity or NMO velocity is the velocity of a constant homogeneous isotropic layer above a reflector which would give approximately the same offset-dependence (normal moveout) as actually observed and is the value used in the invention. In the limit, as offset approaches 0, stacking velocity is the same as root mean square velocity. The velocity analysis used to determine stacking velocity can be carried out by either computing the velocity spectrum or generating constant velocity stacks of adjacent gathers. The purpose of the normal moveout correction of course is to correct the traces for variation of reflection arrival time because of shotpoint to geophone distance (offset) differences. It accounts for the additional time required for energy to travel from a source to flat, reflecting bed and back to a geophone at some distance from the source point compared with the time to return to the geophone at the source point.

The common midpoint gathers of the common offset time migrated data set can then be moveout corrected using the velocity analysis results and stacked to obtain a time image with a high S/N. Common midpoint stacking combines traces for which the midpoint between the source and receiver is the same after the normal moveout correction. Preferably, the stacking operation includes filtering because of timing errors or wave shape differences among the stack traces. The resultant time image has an enhanced S/N.

The problem with the time image produced from the above described sequence of steps is that it contains mispositioned reflectors. In accordance with the invention, this mispositioning is corrected by carrying out an inverse migration on the time image. In other words, the positioning errors in the prestacked time migration are nullified by carrying out inverse time migration on the time image by using the same migration velocities as were used in the common offset migration. Thus, the time image is inverse migrated with a vertically varying laterally constant velocity function to remove the positioning effects of the common offset migration and produce pseudo zero-offset data. Preferably, the same algorithm is used for the inverse migration as is used for the common offset migration. If desired, the inverse of recursive wave number-frequency migration can be done by using the phase shift method outlined by Clarbout, (1985, Imaging the Earth's Interior: Blackwell Science Publishing Company).

The technique employed in the invention is different from the techniques employed in the prior art which are generally characterized under the name of residual migration. Residual migration is usually accomplished by applying a second, or residual migration to the previously migrated data. The inverse migration carried out in the invention has as its purpose to nullify the positioning error of the common offset migration. It therefore must be carried out with the same velocities used for the common offset migration.

In accordance with one embodiment of the invention, the pseudo zero-offset data resulting from the inverse migration of the time image are further processed to generate zero-offset time horizons. The zero-offset time horizons are then used to produce a subsurface model.

The subsurface model can generally be generated by either of two techniques. In one technique, the subsurface model is produced from the zero-offset time horizons by carrying out a kinematic migration on the zero-offset time horizons. In another technique, the subsurface model can be produced by comparing normal-incident, ray tracing on the model with the zero-offset time horizons. Iterative updating of the subsurface model can be usefully employed with either technique. The resulting subsurface model is then used to carry out a zero offset depth migration on the pseudo zero-offset data and produce a depth image.

Zero-offset depth migration must accurately migrate steeply dipping reflectors even when there are several lateral velocity changes. Li, (1991, Compensating Finite-Difference Errors in 3-D Migration and Modeling: Geophysics, 56,1650-1660) has reported a way of correcting errors in space-frequency domain finite-difference depth migration. His compensation operator increases the accuracy of positioning steeply dipping reflectors, suppresses the splitting error, and reduces finite difference grid dispersions. Thus, conducting a space-frequency domain depth migration with Li's compensation operator is the presently preferred mode of carrying out the zero-offset depth migration.

While certain preferred modes of the invention have been hereinabove described, the invention is not to be construed as so limited, except to the extent such limitations are found in the claims:

What is claimed is:

1. A process comprising providing a time image from prestack common offset time migrated data wherein the migration is carried out with a laterally constant velocity function, said time image containing mispositioned reflectors due to the effects of the laterally constant velocity function; and carrying out an inverse migration on said time image using said velocity function followed by application of a corrected velocity function which models the formation subsurface velocities more accurately than does the laterally constant velocity function, then performing a zero-offset depth migration to provide a depth image in which the mispositioning of the reflectors due to the velocity function has been eliminated.

2. A process to correct positioning error in a time image due to the difference between the velocities used for common offset time migration and the actual subsurface velocities, said process comprising:
   a) performing a common-offset migration on a seismic data set amenable to such treatment with a vertically varying, laterally constant velocity function to produce a prestack common-offset time migrated data set;
   b) adjusting the common-offset time migrated data set by applying normal moveout;
   c) carrying out a normal moveout velocity analysis on the adjusted common-offset time migrated data set to correct misalignments of reflectors in the common midpoint gathers of the original prestack common-offset time migrated data set;

d) applying normal moveout correction to the adjusted common offset time migrated data set using the velocities determined from the velocity analysis step;

e) stacking common midpoint gathers of the normal moveout corrected prestack common-offset time migrated data set to obtain a time image with a high S/N; and f) inverse migrating the time image having a high S/N with the same velocity function as used in the common-offset time migration to remove the mispositioning effects of the common offset time migration and produce pseudo zero-offset data.

3. A process as in claim 2 further comprising:

a) generating zero-offset time horizons from the pseudo zero-offset data;

b) producing a subsurface model from the zero-offset time horizons; and c) using the subsurface model, carrying out a zero-offset depth migration on the pseudo zero-offset data to produce a depth image.

4. A process as in claim 3 wherein the subsurface model is produced from the zero-offset time horizons by carrying out kinematic migration on the zero-offset time horizons.

5. A process as in claim 3 wherein the subsurface model is produced by comparing normal incident ray tracing results on the model with the zero-offset time horizons.

6. A process as in claim 3 further comprising iteratively updating the subsurface model.

7. A process as in claim 2 wherein the common-offset migration includes a sequence of normal moveout correction, dip moveout and recursive migration to accommodate for ray bending resulting from vertical velocity changes.

8. A process as in claim 2 wherein the time image having a high S/N is inverse migrated with the same velocities and the same algorithm as for the common offset migration.

* * * * *